(12) United States Patent
Patel

(10) Patent No.: US 11,794,741 B2
(45) Date of Patent: Oct. 24, 2023

(54) SYSTEMS AND METHODS EMULATING AUTOMOBILE MOVEMENT

(71) Applicant: PAYPAL, INC., San Jose, CA (US)

(72) Inventor: Jinesh Patel, Cedar Park, TX (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 17/515,153

(22) Filed: Oct. 29, 2021

(65) Prior Publication Data
US 2022/0048506 A1 Feb. 17, 2022

Related U.S. Application Data

(63) Continuation of application No. 15/840,830, filed on Dec. 13, 2017, now Pat. No. 11,225,250.

(51) Int. Cl.
B60W 30/165 (2020.01)
B60W 50/08 (2020.01)

(52) U.S. Cl.
CPC ........ *B60W 30/165* (2013.01); *B60W 50/082* (2013.01); *B60W 2420/52* (2013.01); *B60W 2554/4041* (2020.02); *B60W 2554/804* (2020.02); *B60W 2555/60* (2020.02); *B60W 2556/65* (2020.02); *B60W 2710/20* (2013.01); *B60W 2720/10* (2013.01)

(58) Field of Classification Search
CPC ...... B60W 30/10; B60W 30/12; B60W 50/14; B60W 50/16; B60W 2050/0095; B60W 2050/0096; B60W 2420/52; B60W 2554/4041; B60W 2555/60; G05D 2201/0213
See application file for complete search history.

(56) References Cited

U.S. PATENT DOCUMENTS

| | | | |
|---|---|---|---|
| 10,543,841 B2 | 1/2020 | Karlsson et al. | |
| 2002/0165649 A1 | 11/2002 | Wilhelm Rekow et al. | |
| 2010/0256852 A1 | 10/2010 | Mudalige | |
| 2013/0231829 A1 | 9/2013 | Gerdt | |
| 2015/0177007 A1* | 6/2015 | Su | B60W 30/165 701/25 |
| 2016/0071418 A1 | 3/2016 | Oshida et al. | |
| 2019/0054920 A1* | 2/2019 | Karlsson | B60W 30/165 |
| 2019/0088135 A1* | 3/2019 | Do | G05D 1/0088 |
| 2019/0163205 A1 | 5/2019 | Kodera et al. | |
| 2019/0225220 A1 | 7/2019 | Laine et al. | |
| 2020/0004269 A1 | 1/2020 | Oba | |

* cited by examiner

*Primary Examiner* — Peter D Nolan
*Assistant Examiner* — Ce Li Ll
(74) *Attorney, Agent, or Firm* — Haynes and Boone, LLP

(57) ABSTRACT

A system, including: a non-transitory memory; and one or more hardware processors coupled to the non-transitory memory and configured to read instructions from the non-transitory memory to cause the system to perform operations including: detecting a first automobile; determining that the first automobile is a self-driving automobile; and in response to determining that the first automobile is a self-driving automobile, causing a second automobile to emulate a motion of the first automobile.

20 Claims, 5 Drawing Sheets

SYSTEMS AND METHODS EMULATING AUTOMOBILE MOVEMENT

CROSS-REFERENCE TO RELATED APPLICATIONS

This application is a continuation of U.S. patent application Ser. No. 15/840,830, filed on Dec. 13, 2017, the disclosure of which is incorporated herein by reference in its entirety.

BACKGROUND

Field of the Disclosure

The present disclosure generally relates to automated automobile movement, and more particularly to systems and methods identifying self-driving automobiles and emulating the movements of self-driving automobiles.

Related Art

Automation is increasing as computing power gets cheaper and more ubiquitous. Examples include increasing use of robotics in manufacturing and surgery, but also in areas that are touched by consumers. For instance, digital personal assistants and home automation hubs are beginning to be commonplace in consumer homes, allowing users to control devices in their homes and to call up information with voice commands.

An example of increasing automation includes self-driving automobiles, which are becoming more sophisticated each year. For instance, some automobiles provide partial self-driving capabilities, including allowing a user to take her hands off of the steering wheel while software intelligence within the car reads lane markers and keeps the car safely within its own lane as it moves forward. Partial self-driving capabilities are usually implemented for short periods of time, requiring a user to place her hands back on a steering wheel after a certain amount of time or when ability to stay within the lane is compromised.

Other automobiles may provide for full or nearly full autonomous driving, even dispensing with a human driver altogether. Whether partially autonomous or fully autonomous, self-driving automobiles tend to rely on a multitude of sensors and sophisticated software. Currently implemented autonomous automobiles may be expected to include a full complement of sensors front, side, and rear to provide comprehensive data regarding the automobile's surroundings, such as other automobiles and obstacles. Such sensors and sophisticated software may be quite expensive, increasing the cost of autonomous features in automobiles beyond a cost that would be expected for non-autonomous automobiles.

Furthermore, as the number of fully autonomous and partially autonomous automobiles increases, they will make up a significant proportion of traffic, while at the same time sharing the road with human-driven automobiles. As the number of cars with various levels of self-driving ability enter the world's roadways, they will continue to interact with each other during the normal flow of traffic and attempt to avoid or minimize collisions whether by human command or autonomously.

Thus, there is a need for systems and methods capable of providing cost effective performance while allowing autonomous automobiles to share the road with automobiles of any autonomous ability.

Figure 1:
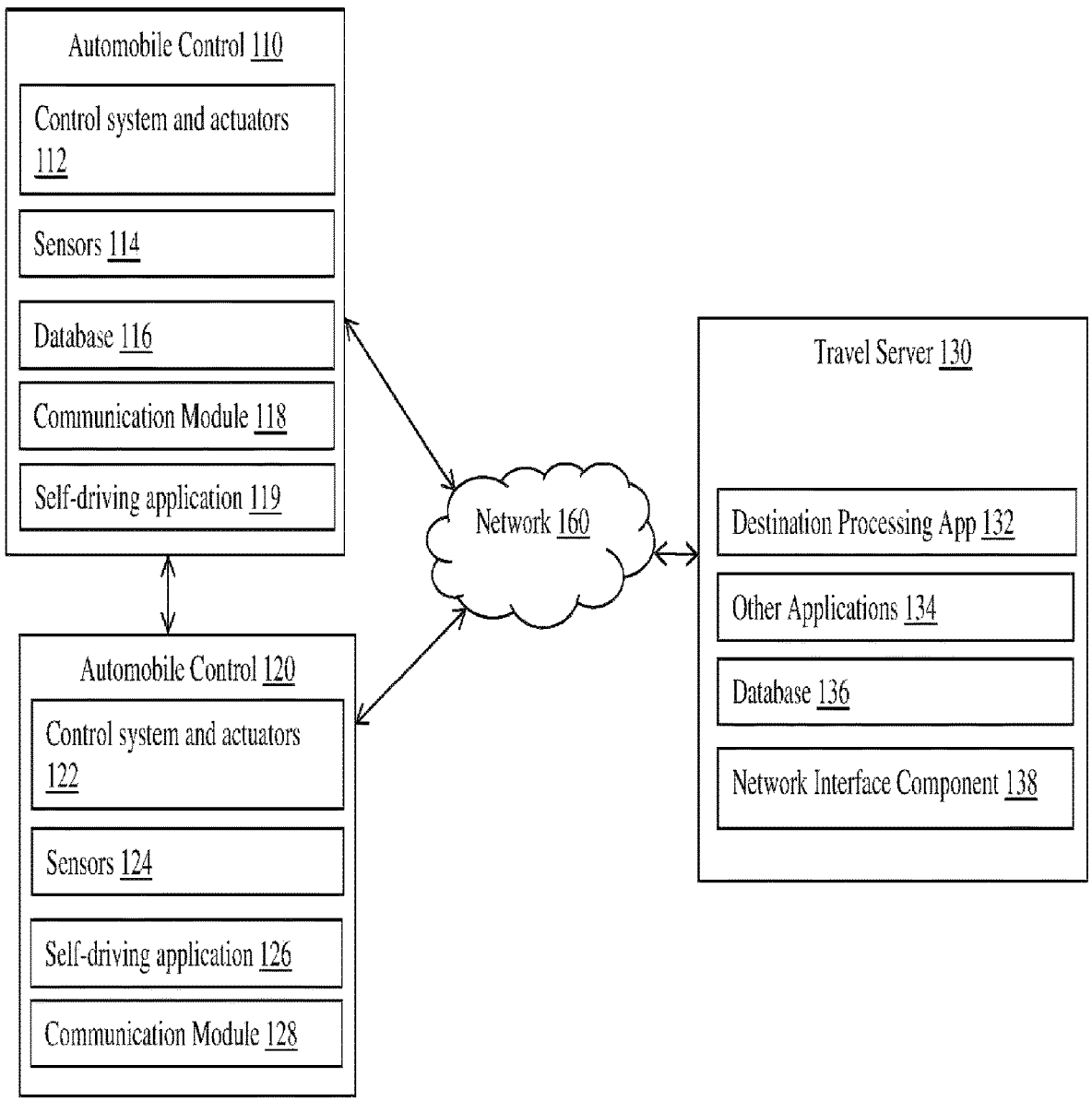
FIG. 1 is an illustration of an electronic system, including multiple components communicatively coupled via a network, according to one embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods for identifying autonomous automobiles. For instance, a first automobile may include sensors and software configured to determine whether an autonomous automobile is present or proximate the first automobile. An example includes the first automobile observing a driving characteristic of another automobile. The characteristic may include consistency of following distance (e.g., within a +/− predetermined distance from the other automobile), consistency of speed (e.g., the other automobile moving within a +/− rate of travel), conformance to traffic rules (e.g., the other automobile traveling no more than a predetermined number over posted speed limits), consistency of lane position (e.g., the other automobile staying within a lane or not moving laterally within the lane by more than a predetermined amount), which lane the other automobile is driving in, and/or the like. The first automobile may include forward-facing radar or mobile laser scanning (e.g., lidar) that emits electromagnetic radiation and detects reflected electromagnetic radiation and processing hardware and software to process the reflected electromagnetic radiation to discern the driving characteristics. The first automobile uses its radar or mobile laser scanning to scan other automobiles on the road and determine their driving characteristics.

Processing features then compare detected driving characteristics to a plurality of stored driving characteristics in a database or other data structure, including cloud storage. The stored driving characteristics may include values for driving characteristics that indicate the possibility of a self-driving automobile. In response to comparing detected driving characteristics to the stored driving characteristics, the processing features determine that the detected driving characteristic conforms to one or more characteristics of the stored driving characteristics, thereby matching or approximately matching a profile of a self-driving automobile.

In another example, the first automobile includes transducers to detect electromagnetic emissions from other automobiles and processing features to process detections of those emissions. Continuing with the example, various self-driving automobiles may emit one or more characteristic electromagnetic signals. For instance, some may include electromagnetic beacons to specifically identify them as self-driving automobiles. Other self-driving automobiles may emit electromagnetic radiation that incidentally identifies them as self-driving automobiles (e.g., radar or lidar emissions known to be associated with particular makes and models of cars). The first automobile may detect such electromagnetic signals and determine that a particular nearby automobile is a self-driving automobile.

Other examples for identifying automobiles as self-driving automobiles may include receiving an identifier from the automobile and determining the identifier is associated with a self-driving automobile, such as the first automobile scanning license plates and matching license plate data with known self-driving automobiles, such as through accessing DMV sites or other available sites or resources, using computing vision to identify contours and/or badges of automobiles and match them against known self-driving automobile makes and models. In fact, various embodiments may include any appropriate technique to identify self-driving automobiles.

Further continuing with the example, after having identified a self-driving automobile, the first automobile is caused to emulate the motion of the self-driving automobile, thereby allowing the first automobile to follow the self-driving automobile. In an example use case, the first automobile may include processing logic to calculate a speed and a position of the self-driving automobile as the self-driving automobile is in motion for a plurality of discrete locations along a driving path. The first automobile may use radar, lidar, computer vision, and/or the like to track the speed of the self-driving automobile and track the lane position of the self-driving automobile. Furthermore, the first automobile may process data from radar, lidar, computer vision and/or the like to create a three-dimensional model having a plurality of time slices, where each of the time slices is associated with a speed value and a location value for the self-driving automobile, wherein a location value may include a lane position and a relative position with respect to the self-driving automobile.

The first automobile then conforms to the speed and position of the self-driving automobile in real-time as the first automobile follows the self-driving automobile along the plurality of discrete locations of a driving path. For example, processing logic at the first automobile may send signals to various actuators within the first automobile to cause those sensors and actuators to adjust steering, breaking, throttle, and/or the like to conform to the speed and position of the self-driving automobile.

In another example, processing logic identifies a destination of the first automobile and of the self-driving automobile, compares the destinations, and upon determining that the destinations are the same or similar, causing the first automobile to emulate the motion of the self-driving automobile in order to bring the first automobile to the destination. To a human observer, it would appear that the first automobile follows the self-driving automobile.

Of course, it may be appropriate at a point to switch from an emulation mode to a human-driving mode for the first automobile. Examples include when the first automobile may lose sight of the self-driving automobile, at the direction of the human user, upon detection of possible unsafe conditions, and/or the like. The first automobile may use various warnings, such as flashing lights or haptic warnings, to alert the human driver to take control of the steering, brakes, and throttle.

Various embodiments may include physical systems to implement emulation of motion of a self-driving automobile, including radar, lidar, vision hardware, hardware and software to process information (e.g., motion data) from the radar, lidar, vision, and a control system to determine specific control signals for actuators in response to the processed information. Various other embodiments may include methods to perform the emulation. Other embodiments may include non-transitory machine-readable media storing machine-readable instructions executable to provide functionality as described herein.

Various embodiments may include one or more advantages over conventional systems. For instance, in a use case in which the first automobile (the following automobile) is not fully self-driving, it may nevertheless be able to emulate an identified self-driving automobile, thereby allowing the driver of the first automobile to experience benefits of self-driving. Furthermore, in various embodiments the first automobile may not include as many sensors or software as sophisticated as that of a fully self-driving automobile. For instance, the first automobile may omit sideways facing sensors or rear facing sensors that would otherwise be present in a fully self-driving automobile. However, the first automobile may still be able to perform similarly to a fully self-driving automobile, at least for a period of time and in certain circumstances. Thus, various embodiments may save manufacturing cost relative to a fully self-driving automobile by allowing automobiles with less self-driving capability to emulate automobiles with more self-driving ability. Additionally, allowing the first automobile to follow the self-driving automobile while emulating the self-driving automobile may make traffic flow more efficient and safe by providing a consistent and safe following distance for the first automobile. Thus, another advantage may include more efficient and safe traffic flow as well as a greater cooperation between automobiles of different self-driving abilities.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices may include specialized automobile control devices, such as digital controller-based systems that perform cruise control, engine control, braking, instrumentation, and the like. Example devices may use hardware, software, and/or firmware executed by a processor (e.g., a digital controller) to provide functionality described herein. Servers may include stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes automobile control 110, automobile control 120, and travel server 130, in communication over a network 160. Automobile control 110, automobile control 120, and travel server 130 may each include one or more processors, memories, and other appropriate components for executing instructions such as program code and/or data stored on one or more computer readable media to implement the various applications, data, and steps described herein. For example, such instructions may be stored in one or more computer readable media such as memories or data storage devices internal and/or external to various components of system 100, and/or accessible over network 160.

Automobile control 110 may include a communication module 118 that may utilize appropriate hardware and software configured for wired and/or wireless communication with automobile control 120 and/or travel server 130. For example, in one embodiment, automobile control 110 may be implemented as one or more digital controller-based devices having access to a cellular data platform, a Wi-Fi platform, or the like. In another example, automobile control 110 may interface with one or more personal devices of a driver or rider and utilize the communications functionality and applications of the personal device. For example, automobile control 110 may interface with a user's personal computer (PC), a smart phone, laptop/tablet computer, wristwatch with appropriate computer hardware resources, eyeglasses with appropriate computer hardware, other type of wearable computing device, implantable communication devices, and/or other types of computing devices capable of transmitting and/or receiving data, such as an IPAD® from APPLE®. Examples of operating systems for use with automobile control 110 include iOS® OS, Android® OS, and the like. Thus, any of the components 112-119 may include functionality that may be implemented entirely within a first automobile or may be distributed among the first automobile, the user's personal device, and/or the travel server 130.

Automobile control 110 of FIG. 1 includes components such as control system and actuators 112, sensors 114, a database 116, a communication module 118, and a self-driving application 119. Components 112-119 may correspond to executable processes, procedures, and/or applications with associated hardware. In other embodiments, automobile control 110 may include additional or different modules having specialized hardware and/or software as required.

Control system and actuators 112 may correspond to one or more hardware devices and associated processes to operate a first automobile through controlling operations such as engine function, braking function, steering function, instrumentation, infotainment, navigation, and the like. In various embodiments, control system and actuators 112 may include an engine control unit (ECU), which monitors items such as fuel/air mixture, revolutions per minute, and the like and uses actuators (not shown) to physically implement and adjust those items. Also in various embodiments, control system and actuators 112 may include a braking control unit, which monitors traction conditions and breaking commands and actuates calipers or other breaking hardware to cause the first automobile to slow down, stop, distribute torque among wheels, and the like. Various embodiments of control system and actuators 112 may also include a steering control unit, which may be a drive-by-wire unit, a hydraulically assisted unit, or other steering unit that physically changes the direction of at least the front wheels of the automobile according to user commands or other commands.

Of course, those are examples of automobile functions that may be performed by control system and actuators 112, but those examples are not intended to be comprehensive. Rather, in other embodiments, additional functions, such as transmission functions, traction control, tire pressure monitoring, hybrid drive functions, and electric drive functions may be assigned to control system and actuators 112. Furthermore, the scope of embodiments is not limited to an internal combustion automobile, as any automobile drive system now known or later developed may be adapted for use in various embodiments.

Sensors 114 may include any of a variety of devices and computer functionality to determine a speed and position of an automobile as well as any other automobiles that may be proximate the automobile. For instance, sensors 114 may include a forward-facing sensor system such as radar, lidar, visual light or infrared vision sensors and their associated processing systems. Sensors 114 may emit electromagnetic radiation and receive reflections of that emitted electromagnetic radiation or may simply receive electromagnetic radiation, where examples of electromagnetic radiation include radio signals, microwave signals, visible light, infrared light, and/or the like. For instance, radar and lidar may emit radar or lidar signals and then receive reflections of the signals, whereas vision sensors may or may not emit light but in any event receive reflected light. Sensors 114 process the received electromagnetic radiation to determine position and speed of the first automobile as well as objects (e.g., other automobiles) around the first automobile. In one example, the first automobile may use sensors 114 to calculate the speed and position of another automobile as that other automobile is in motion along a driving path of that other automobile.

In an example embodiment, sensors 114 may read license plate data of other automobiles, read badging of other automobiles, or discern contours of other automobiles to visually identify a make and model of other automobiles, and/or the like. Continuing with the example embodiment, sensors 114 may also receive electromagnetic signals from other automobiles, such as communication signals that identify those other automobiles or other emissions such as radar emissions. Sensors 114 may be in communication with control system and actuators 112, database 116, communications module 118, and self-driving application 119 via a bus or network as appropriate.

In various embodiments, automobile control 110 includes self-driving application 119 as may be desired in particular embodiments to provide full or partial self-driving abilities. For instance, self-driving application 119 may include hardware and/or software functionality to communicate with control system and actuators 112 to steer the first automobile and control the speed of the first automobile according to one or more driving algorithms that may be fully or almost fully automated or may include some combination of automation and human-based driving. In one example, self-driving application 119 uses information from sensors 114 to map speed and position of another automobile over a plurality of discrete locations and then provide signals to control system and actuators 112 to emulate the speed and position of the other automobile. Furthermore, self-driving application 119 may include location detection applications, such as a mapping, compass, and/or GPS applications, which may be used to determine a physical location for the automobile.

Self-driving application 119 may further include social networking applications and/or travel applications. For instance, self-driving application 119 may communicate via module 118 (and perhaps network 160) with automobile control 120 and travel server 130 to identify destinations of other automobiles, compare destinations of the other automobiles to the destination of the first automobile, and to emulate the movement of another automobile in response to determining a same destination. In this embodiment, self-driving application 119 may include a social media component to disclose and receive travel information from other users. Self-driving application 119 may include device interfaces and other display modules that may receive input and/or output information. For example, self-driving application 119 may contain software programs, executable by a processor, including a graphical user interface (GUI) configured to provide an interface to a driver by a display screen in the first automobile.

Automobile control 110 may further include database 116 stored to a memory of automobile control 110, which may store various applications and data and be utilized during execution of various modules of automobile control 110. Thus, database 116 may include, for example, IDs such as operating system registry entries, IDs associated with hardware of automobile control 110, entries including stored driving characteristics associated with self-driving automobiles, destination information, user profile information, and the like. Self-driving application 119 may access database 116 and use data, such as stored driving characteristics, to compare driving characteristics of other automobiles on the road to those stored driving characteristics and to determine that one or more other automobiles are self-driving automobiles by making a match or a near match between observed driving characteristics and one or more stored driving characteristics.

For instance, an exact match of driving characteristics may not be used in some embodiments, as observed characteristics may be weighted and applied in an algorithm to determine whether it is more likely than not that and other automobiles a self-driving automobile. For instance, various algorithms may include threshold parameters that may be met by correlating observed driving characteristics to stored driving characteristics and weighting the correlation numbers and then comparing weighted correlation numbers or sums to one or more threshold parameters. In other embodiments, artificial intelligence and self-learning algorithms may be used to identify other self-driving automobiles using any useful data stored to database 116.

Database 116 may also include historical location information of the user, historical destination information of the user, and may include pre-programmed map data. Self-driving application 119 may access database 116 and use such information to provide navigation services and useful information to a user on a display within the automobile.

Automobile control 110 includes at least one communication module 118 adapted to communicate with automobile control 120 and/or travel server 130. In various embodiments, communication module 118 may include a broadband device, a satellite device and/or various other types of wired and/or wireless network communication devices including microwave, radio frequency, infrared, Bluetooth, and NFC devices.

Automobile control 120 may be included in an additional automobile that shares the road with the automobile associated with automobile control 110. In other words, automobile control 110 automobile control 120 may be associated with two different automobiles in motion and sharing the road concurrently. Automobile control 120 may be implemented using hardware and/or software, the same as or similar to that described above with respect to automobile control 110.

Control system and actuators 122 may be implemented within the other automobile the same as or similar to control system and actuators 112 are implemented within the automobile associated with automobile control 110. Control system and actuators 122 may also perform the same or similar functions as those described above with respect to control system and actuators 112.

Sensors 124 may be implemented within the other automobile the same as or similar to sensors 114 are implemented within the automobile associated with automobile control 110. Also, sensors 124 may perform the same or similar functions as those described above with respect to sensors 114.

Communication module 128 may be implemented within the other automobile the same as or similar to communication module 118 is implemented within the automobile associated with automobile control 110. Communication module 128 may also perform the same or similar functions as those described above with respect to communication module 118. Furthermore, automobile control 120 may include other components, such as a database (not shown) the same as or similar to database 116.

Self-driving application 126 may include a more sophisticated and more robust suite of self-driving logic and hardware than is included with self-driving application 119. For instance, self-driving application 126 in this example may include more sensors 124 at front, side, and rear to provide a more comprehensive view of surroundings of the automobile associated with automobile control 120. In other embodiments, self-driving application 126 and sensors 124 may be the same as or similar to self-driving application 119 and sensors 114. However, an example use case includes the self-driving application 126 and sensors 124 being quite robust and providing fully-autonomous or nearly-autonomous operation during normal driving, whereas the example use case also includes self-driving application 119 and sensors 114 being less advanced. Thus, self-driving application 119 and sensors 114 may be used to emulate the operation of the automobile associated with automobile control 120 in order to provide benefits of more advanced autonomous operation to the less costly system at automobile control 110.

Travel server 130 may be maintained, for example, by an online or mobile service provider, which may provide information to either or both of automobile control 110 and automobile control 120 and may even in some aspects be used to provide cloud-based processing functionality and data storage that would otherwise be the responsibility of automobile control 110 or automobile control 120. In this regard, travel server 130 includes one or more processing applications which may be configured to interact with automobile control 110, automobile control 120, and/or another device/server to facilitate self-driving.

Travel server 130 of FIG. 1 includes a destination processing application 132, other applications 134, a database 136, and a network interface component 138. Destination processing application 132 and other applications 134 may correspond to executable processes, procedures, and/or applications with associated hardware. In other embodiments, travel server 130 may include additional or different modules having specialized hardware and/or software as required.

Destination processing application 132 may correspond to one or more processes to track destinations of automobiles, provide navigation services to automobiles, and the like. For instance, in one embodiment, destination processing application 132 may compare locations of various automobiles and send a notification to self-driving application 119 when determining that the automobile associated with self-driving application 126 has a same destination. Furthermore, self-driving application 119 and self-driving application 126 may communicate over network 160 to destination processing application 132 to coordinate destinations or any other useful travel functions. Additionally, automobile control 110 and automobile control 120 may communicate with each other via network 160 and/or directly using some other kind of connection, such as Bluetooth or Wi-Fi.

In one example, other applications 134 includes a social media component, allowing self-driving application 119 and self-driving application 126 to communicate with each other based on linked attributes at the social media component. Other applications 134 may provide additional utility, such as automobile diagnostics and the like. Other applications 134 may contain software programs, executable by a processor, including a graphical user interface (GUI), configured to provide an interface to the user when accessing travel server 130. In various embodiments where not provided by destination processing application 132, other applications 134 may include connection and/or communication applications, which may be utilized to communicate information to over network 160.

Additionally, travel server 130 includes database 136. Database 136 may include any information needed to detect and/or emulate or improve the detection and/or emulation of self-driving automobiles, such as for example social network identifications, automobile identifications, mapping and navigation data, etc. Furthermore, database 136 may also include user destination history information for a multitude of users, including the user at automobile control 110, the user at automobile control 120, user location history, and identifying information for self-driving automobiles, such as by license plate number, make and model, and visual identification indicators correlated to makes and models.

In various embodiments, travel server 130 includes at least one network interface component 138 adapted to communicate with automobile control 110 and/or automobile control 120 over network 160. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2:
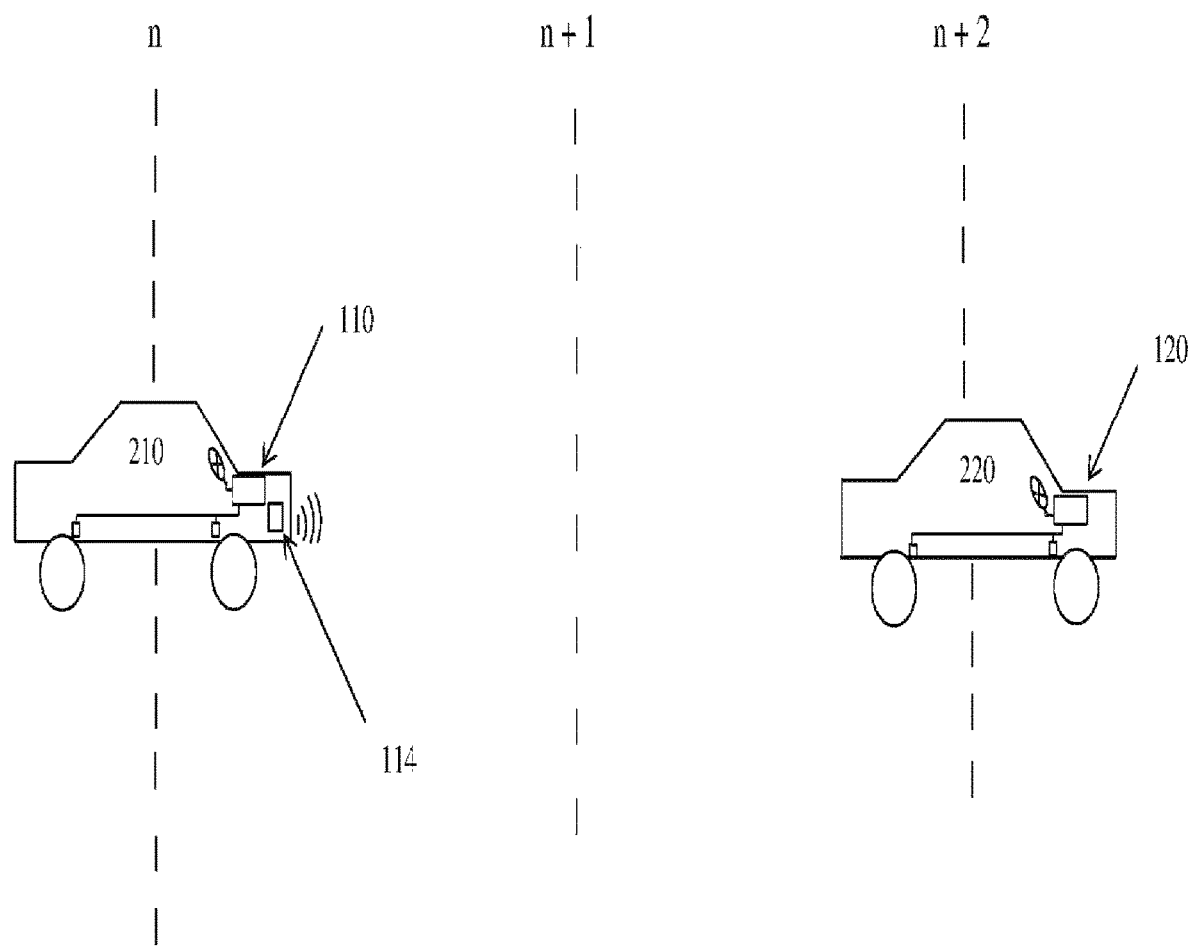
FIG. 2 is a schematic diagram of one automobile following another automobile by emulation, according to one embodiment.
Figure 3:
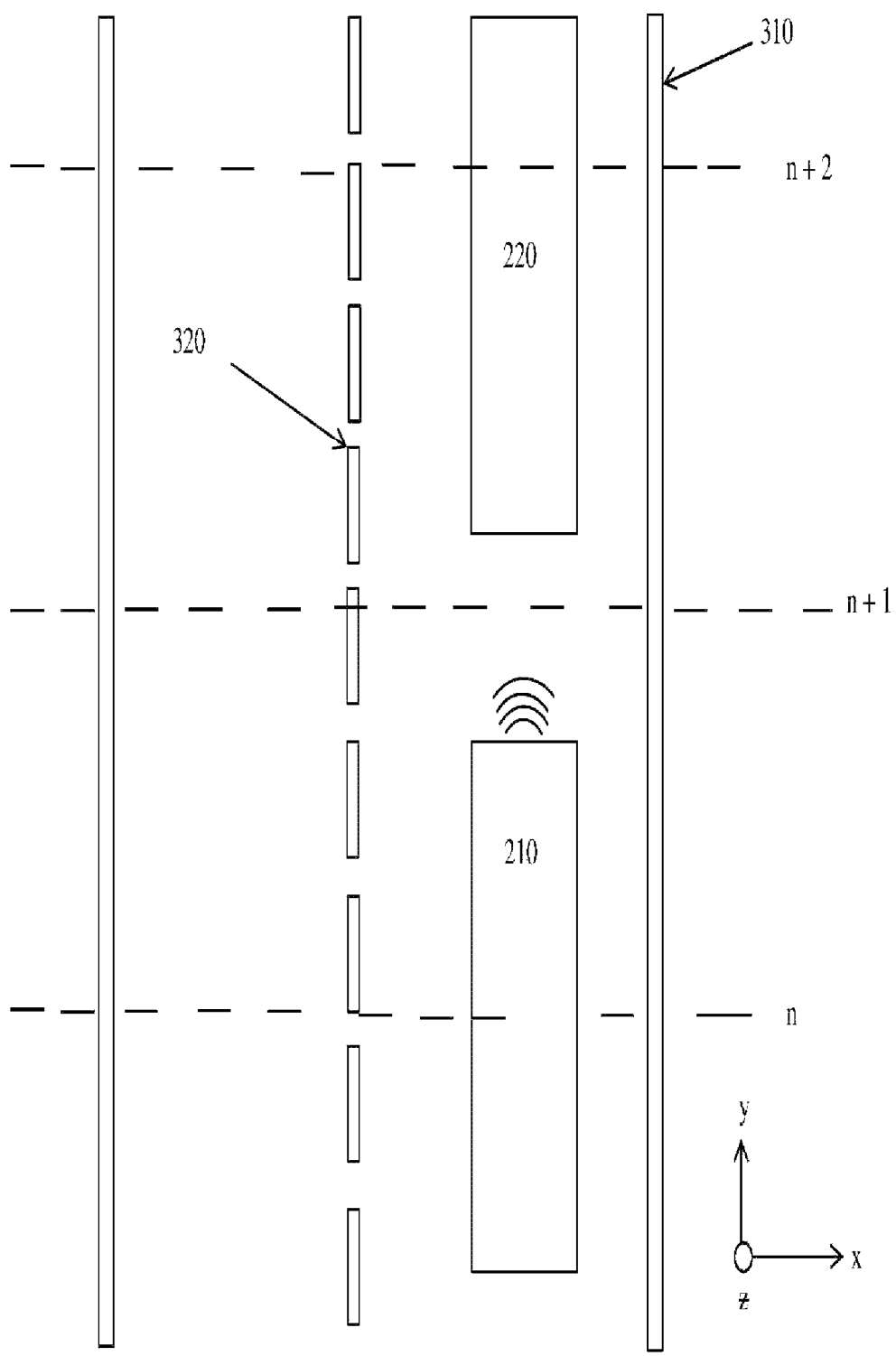

FIGS. 2 and 3 illustrate automobiles 210 and 220, according to one embodiment and from two different perspectives. Automobile 210 and automobile 220 are both in motion and traveling forward. Specifically, automobile 210 is following automobile 220 along the y-axis. Automobile 210 includes automobile control 110, and automobile 220 includes automobile control 120. Automobile control 110 and automobile control 120 are both described above with respect to FIG. 1, and automobile control 110 and automobile control 120 are implemented in their respective automobiles 210, 220 to control the operation of those automobiles consistently as described above Sensor 114 includes forward-facing radar or lidar or computer vision, thereby emitting electromagnetic radiation and then receiving reflected election magnetic radiation. In one example, automobile control 110 uses the data from sensors 114 to detect the presence of automobile 220 and then to determine that automobile 220 is a self-driving automobile. Determining that automobile 220 is a self-driving automobile may include any of a variety of techniques performed by automobile control 110. In one example technique, sensors 114 observe a driving characteristic of the first automobile, such as breaking characteristics, acceleration characteristics, lane placement characteristics, constancy of speed, disciplined observation of driving laws, and the like. Such driving characteristics may be defined by sets of numerical parameters and then correlated with stored driving characteristics (e.g., at database 116). Appropriate formulas may then be used to generate correlation values and then compare those correlation values to one or more thresholds. Each characteristic may be weighted appropriately, and a correlation score or sum exceeding a threshold may be an indication that automobile 220 is indeed a self-driving automobile. Of course, the scope of embodiments may include using any appropriate driving characteristic and any appropriate threshold and weighting formula. In fact, the scope of embodiments may use any appropriate technique to match observed driving characteristics with known driving characteristics to determine whether a given automobile is a self-driving automobile.

In another example, sensors 114 may read license plate data, e.g., using character recognition and then querying license plate characters over network 160 or with data in database 116 to determine whether a given automobile is a self-driving automobile. For instance, resources (e.g., database 136) over network 160 or within database 116 may allow referencing license plate data with indications of self-driving abilities for various automobiles. For instance, automobile control 110 may compare license plate data of automobile 220 with stored license plate data and then discern a self-driving status of the first automobile from the comparing. Alternatively, automobile control 110 may generate a query over network 160 to travel server 130, which then returns a result indicating whether or not automobile 220 is a self-driving automobile. In one embodiment, an identifier of the automobile, such as a license plate or vehicle identification number (VIN), maybe detected or obtained, and a database or site, such as managed by the DMV or NHTSA, maybe queried or scraped to determine a self-driving level or self-driving type of the automobile, e.g., level 0 to level 5, where current classifications are (generally): Level 0—no self-driving features, Level 1—some driver assistance, Level 2—additional driver assistance, Level 3—conditioned autonomy, Level 4—nearly autonomous, and Level 5—completely autonomous.

In another example, sensors 114 may visually identify a contour of a rear shape of the first automobile from reflected electromagnetic radiation. Automobile control 110 may then compare identified contours against data in database 116 or may generate a query over network 160 to travel server 130 to perform the comparison. Thus, automobile control 110 or travel server 130 may compare identified contours with stored contour data (e.g., database 116 or 136) to discerning make and model of automobile 220 from the contour and discern a self-driving status of automobile 220 from the make and model. Sensors 114 may additionally or alternatively receive a signal transmitted from automobile 220 and discern a self-driving status of automobile 220 from that signal, wherein some examples the signal may be an identifying signal for make and model or self-driving status. In other examples the signal may be an incidentally identifying signal, such as radar for adaptive cruise control that can be assumed to be associated with self-driving abilities of automobile 220.

In response to determining that automobile 220 is a self-driving automobile, automobile control 110 causes automobile 210 to emulate the motion of automobile 220. In one embodiment, the amount or type of emulation is based further on determining a level or type of the self-driving automobile, e.g., a Level 5 self-driving automobile maybe emulated must closer than a Level 3 self-driving automobile. Continuing with the example, sensor 114 processes the returned electromagnetic radiation to determine speed and position of automobile 220. Additionally or alternatively, sensor 114 may include infrared or visible light image processing to also provide data that can be processed to indicate speed and position of automobile 220. Automobile control 110 uses that data, as described above with respect to FIG. 1, to provide control signals to control system and actuators 112 in order to cause automobile 210 to emulate the motion of automobile 220.

For instance, computer logic of automobile control 110 (e.g., self-driving application 119) uses the data from sensors 114 to generate a three-dimensional model of the position and speed of automobile 220 at a plurality of locations. FIGS. 2 and 3 show example X, Y, and Z axes as well as a plurality of locations n, n+1, n+2. In one example, computer logic of automobile control 110 generates the three-dimensional model by tracking a position of automobile 220 with respect to the right-hand side line 310, a position of automobile 220 with respect to the left-hand side line 320, a distance between automobile 210 and 220, and a speed of automobile 220. Computer logic of automobile control 110 performs these calculations for each of the positions n, n+1, n+2 and stores the results of the calculations in a memory. Though the example of FIGS. 2 and 3 shows only three positions, it is understood that various embodiments may use as many positions as is appropriate. For example, various embodiments may generate a new position every meter, every 10 meters, or other appropriate interval and perform the calculations described above at each of those positions.

Computer logic of automobile control 110 (e.g., self-driving application 119) accesses the position and speed calculations from memory and transforms them into commands that can be issued to control system and actuators 112 to physically cause automobile 210 to emulate the motion of automobile 220. For example, throttle and brake commands may be used to maintain a speed that matches or approximately matches the speed of automobile 220, and steering commands may be used to maintain a lane placement that matches or approximately matches the speed of automobile 220 so that as automobile 210 approaches location n it matches or approximately matches the speed and position that automobile 220 had at that same location. Furthermore, self-driving application 119 uses this calculation to maintain speed, following distance, and lane placement both in straight driving situations and in curved or hilly driving situations. Furthermore, various embodiments may also calculate a z-axis position of automobile 220 to detect hilly driving situations and perform braking or throttle as appropriate.

In curvy driving situations, the three-dimensional model may even continue to follow automobile 220, despite losing straight line of sight with automobile 220 by interpolating three-dimensional placement of automobile 220 from its previous positions and rate of change in the x-axis.

Of course, the drive may eventually come to an end as one or both drivers reach their destinations or decide to part ways. Self-driving application 119 may determine to cease emulating the motion of automobile 220 according to a variety of scenarios. For instance, if it loses line of sight or other communication with automobile 224 longer than a set time threshold or distance threshold, then self-driving application 119 may alert the human driver and hand control over to the human driver. Self-driving application 119 may hand over control to the human driver in other scenarios, such as when it is detected that driving conditions have become hazardous. In other embodiments, a human driver may signal to self-driving application 119 that the human driver desires to return to a human-driving mode. The human driver may signal to the self-driving application 119 in any of a variety of ways including, e.g., a voice command, a touch command, or pressing a button.

In some embodiments self-driving application 119 may use various techniques to predict when to hand control to a human driver in order to alert the driver well in advance. For example 1) by determining the destination of automobile 224 and then further determining that both automobiles are nearing the destination; 2) by analyzing the driving path and determining a curve, road hazard, or the like that is expected to create a situation where line of sight with automobile 224 is lost; 3) by communicating with similar automobiles that have emulation technology and identifying where and why they lost connections with the automobiles they were following.

In other embodiments the automobiles 210 and 220 may communicate with each other, either through travel server 130 or directly to each other using for example Bluetooth or Wi-Fi. Thus in one embodiment lane placement and speed may be shared from automobile 220 to automobile 210, which may be used instead of data from sensors 114 or may be used to supplement the data from sensors 114 in generating the three-dimensional model. In another example, automobile control 120 (automobile 220) may be used to directly control the actuators 112 (automobile 210) in real time using a reliable wireless communication between automobiles.

In yet another example, self-driving applications 119 and 126 may communicate either directly with each other or through travel server 130 to share destination information. In such an example, self-driving application 119 (automobile 210) may emulate the motion of automobile 220 so long as self-driving application 126 (automobile 220) is moving in a desired direction toward the destination of automobile 210. When automobile 220 ceases to move in a desired direction, self-driving application 119 may then either switch to a human-driving mode or communicate with another self-driving automobile proceeding in a desired direction and then emulate the movement of that subsequent self-driving automobile. As noted above, coordination of destinations may be performed using destination processing application 132 of travel server 130 or directly automobile-to-automobile via applications 119, 126 as appropriate in various embodiments.

Figure 4:
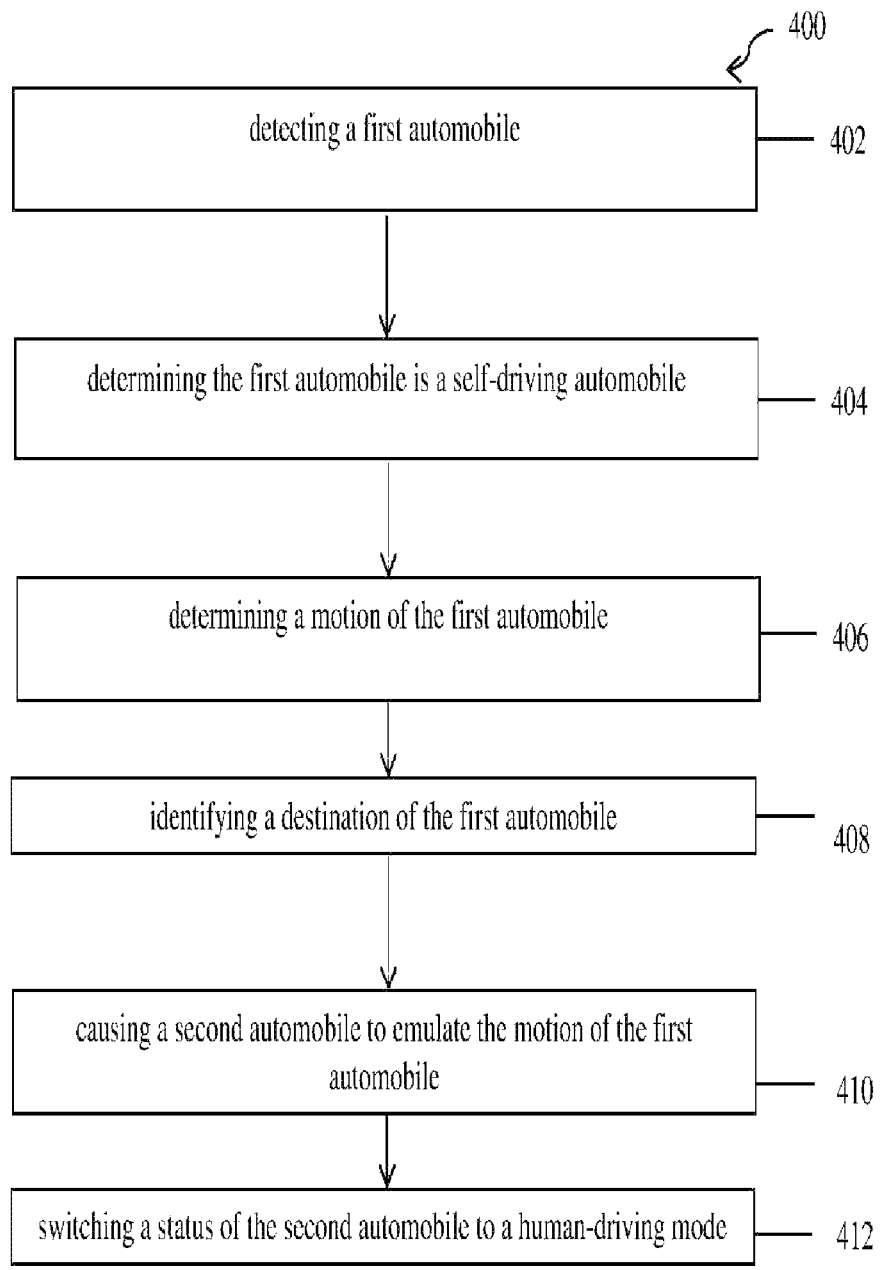
FIG. 4 is an illustration of an example method for emulating motion of an automobile, according to one embodiment.

FIG. 4 is an illustration of an example method 400, adapted according to one embodiment. In the following example, the illustrations are provided with respect to automobile control 110 however, it is to be understood that the actions of method 400 may be performed by automobile control 110, travel server 130, or a combination thereof. The various actions are provided by the devices as a result of executing computer-readable code by one or more processors, wherein the computer-readable code includes instructions. In this example, automobile control 110 is associated with an automobile (e.g., automobile 210 of FIGS. 2 and 3) that is following a first automobile (e.g., automobile 220), and it emulates the motion of the first automobile.

At action 402, automobile control 110 detects a first automobile. In one example, automobile control 110 may receive input from forward-facing radar or lidar to detect the presence of another automobile. However, other embodiments may detect automobiles using any appropriate technique, including receiving electromagnetic signals from other automobiles, receiving input from a social media driving application that tracks other automobiles, and the like.

At action 404, automobile control 110 determines that the first automobile is a self-driving automobile. In one example, automobile control 110 may observe a driving characteristic of the automobile, wherein examples of driving characteristics include obeying traffic laws, consistency of speed, and consistency of lane position. Such example may assume that self-driving automobiles conform to behavior patterns that may be observed and compared to stored data to determine whether an automobile's driving matches known behavior patterns. Automobile control 110 then may compare the observed driving characteristics to a plurality of stored driving characteristics (e.g., in a database) and based on the comparing, determine that the driving characteristic conforms to one or more stored driving characteristics.

In another example of action 404, automobile control 110 may receive a signal (e.g., a radio beacon signal) transmitted by the first automobile that either purposefully or incidentally identifies the first automobile as a self-driving automobile. Automobile control 110 may then discern a self-driving status of the first automobile from that signal. Additionally or alternatively, automobile control 110 may compare license plate data of the first automobile to stored license plate data, where the license plate data is referenced in a database with self-driving status. Then based on the comparing, automobile control 110 may discern a self-driving status of the first automobile. Similarly, some example embodiments may identify a rear contour shape of the first automobile, discerning make and model of the first automobile from the contour, and then cross reference the contour to a plurality of stored contours associated with make and model data as well as self-driving status of those makes and models.

At action 406, automobile control 110 determines a motion of the first automobile. For example, automobile control 110 may use data from forward-facing radar or lidar to determine a speed of the first automobile, a distance between the automobile with automobile control 110 and the first automobile, a position of the first automobile to respect to its lane markers, and the like.

At action 408, automobile control 110 identifies a destination of the first automobile. For example, automobile control 110 may communicate with an automobile control associated with the first automobile to determine the destination of the first automobile, or it may communicate with travel server 130 for the same purpose. Automobile control 110 may compare the destination of the first automobile to the destination of the automobile that is associated with automobile control 110. In some instances it may be determined that the first automobile and the second automobile have a same destination. Various embodiments may include identifying the destination of the first automobile as a factor used in deciding to emulate the motion of the first automobile at action 410.

At action 410, automobile control 110 causes the second automobile (i.e., the automobile 210 associated with automobile control 110) to emulate the motion of the first automobile. For instance, action 410 may include calculating a speed and a position of the first automobile as the first automobile is in motion for a plurality of discrete locations along a driving path and then causing the second automobile to conform to the speed and the position of the first automobile as the second automobile follows the first automobile along the plurality discrete driving locations. An example is shown at FIGS. 2 and 3, wherein the discrete driving locations are labeled n, n+1, n+2.

In such an example, automobile control 110 would communicate with sensors and actuators of the second automobile to adjust speed and steering of the second automobile in real-time as it follows the first automobile along the plurality discrete locations. Thus, automobile control 110 would attempt to approximate speed and position of the first automobile (e.g., automobile 220 of FIGS. 2 and 3) at each of positions n, n+1, n+2, by the second automobile (e.g., automobile 210) as it reaches each of the positions n, n+1, n+2. The scope of embodiments is not limited to exact and precise conformance of speed and position, as approximation within the limits and capabilities of the automobile control 110 and its actuators and sensors in apparent real-time occurs at action 410. For instance, conformance within a pre-determined percentage of speed or position may be performed at action 410.

At action 412, automobile control 110 switches the status of the second automobile to a human-driving mode. For instance, automobile control 110 may switch to a human-driving mode in response to determining that the first automobile is changing direction or destination, that traveling conditions have become unsafe, that the first automobile has left sight of the sensors associated with automobile control 110, or for any other appropriate reason. The human-driving mode may not be entirely free of autonomous features, though the human-driving mode may be more human-oriented than the emulation mode of action 410. For instance, the human-driving mode may still employ adaptive cruise control or lane keeping assist, while still accepting human driving input.

The scope of embodiments is not limited to the actions 402-412 of FIG. 4. Rather, other embodiments may add, omit, rearrange, or modify one or more actions as appropriate. For instance, some embodiments may omit identifying a destination of the first automobile and instead determine to emulate the motion of the first automobile based on other factors, such as a human request, or automatically in response to having followed the first automobile for certain time or distance. Also, automobile control 110 may repeat actions 402-412 as desired on one or more journeys.

Furthermore, various embodiments may offer advantages not provided by conventional systems. For instance, some embodiments may allow the automobile that is following and emulating to enjoy the benefits of self-driving without having the same sophistication of hardware or software. For instance, the following and emulating automobile may omit some sensors to the sides or to the rear or may omit sophisticated hardware functions including traffic sign recognition, etc. Moreover, the actions of FIG. 4 may be used as a semi-autonomous mode in an otherwise fully self-driving automobile in response to hardware or software malfunction or in response to user request.

Figure 5:
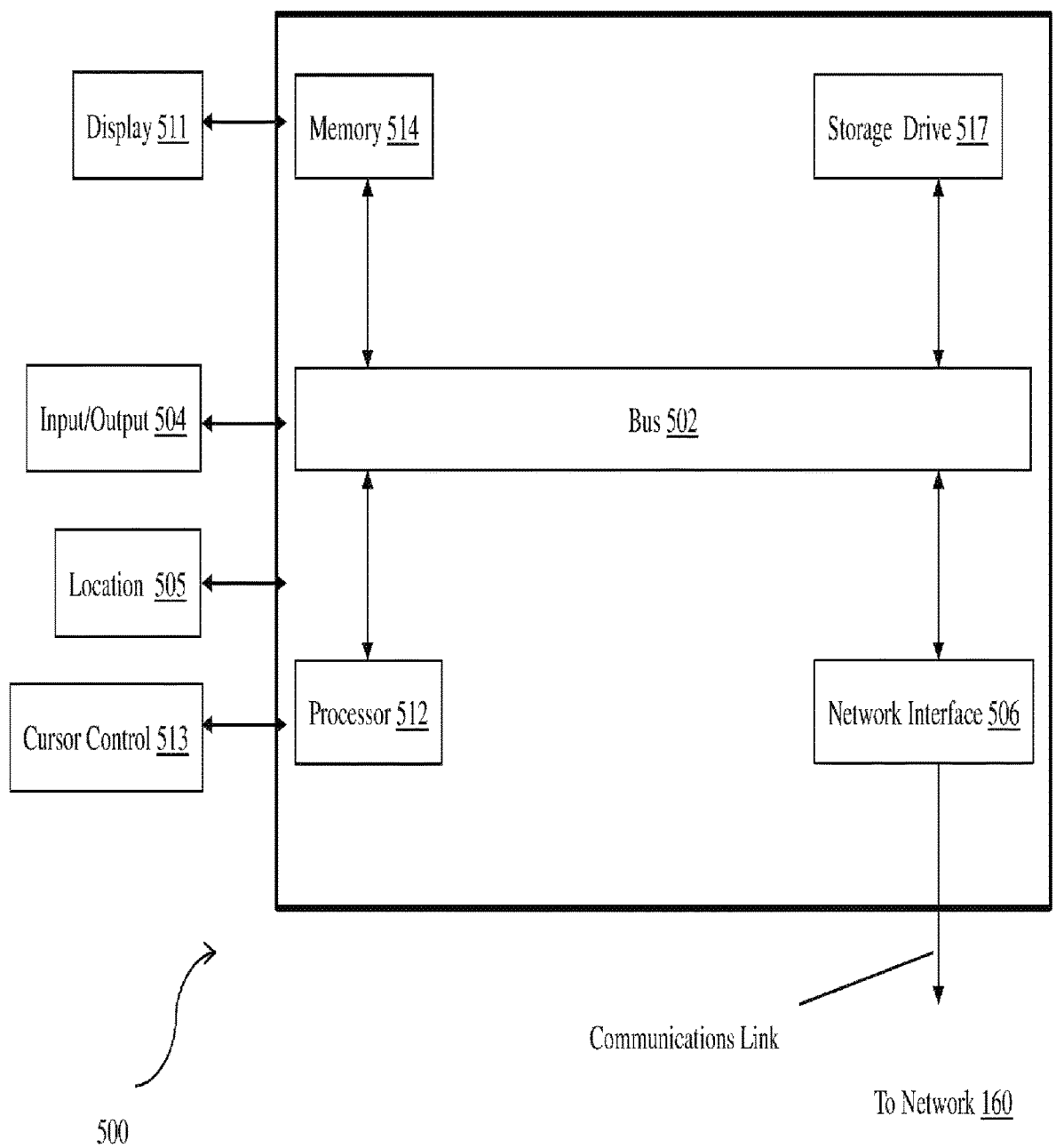
FIG. 5 is an illustration of an example computer system that may be used as an automobile controller or a server and to perform the actions described with respect to FIGS. 1-4, according to one embodiment.

Referring now to FIG. 5, an embodiment of a computer system 500 suitable for implementing, for example, the automobile controls 110, 120, and travel server 130 of FIG. 1 discussed above. It should be appreciated that other devices used in automobiles or in the cloud discussed above may be implemented as the computer system 500 in a manner as follows.

In accordance with various embodiments of the present disclosure, computer system 500, such as a automobile control system, computer, and/or a network server, includes a bus 502 or other communication mechanism for communicating information, which interconnects subsystems and components, such as a processing component 512 (e.g., processor, micro-controller, digital signal processor (DSP), etc.), a system memory component 514 (e.g., RAM) a storage drive component 517 (e.g., solid-state, hard drive, or optical), a network interface component 506 (e.g., wireless card, modem, or Ethernet card), a display component 511 (e.g., a touchscreen, CRT, or LCD), an input/output component 504 (e.g., keyboard, keypad, a touchscreen), a cursor control component 513 (e.g., mouse, pointer, or trackball), and/or a location determination component 505 (e.g., a Global Positioning System (GPS) device as illustrated, a cell tower triangulation device, and/or a variety of other location determination devices known in the art.) In one implementation, the storage drive component 517 may comprise a database having one or more storage drive components.

In accordance with embodiments of the present disclosure, the computer system 500 performs specific operations by the processing component 512 executing one or more sequences of instructions contained in the memory component 514, such as described herein with respect to FIGS. 1-4 discussed above. Such instructions may be read into the system memory component 514 from another computer readable medium, such as storage drive 517. In other embodiments, hard-wired circuitry may be used in place of or in combination with software instructions to implement the present disclosure.

Logic may be encoded in a computer readable medium, which may refer to any tangible and non-transitory medium that participates in providing instructions to the processing component 512 for execution. Such a medium may take many forms, including but not limited to, non-volatile media and volatile media. In various implementations, non-volatile media includes hard drive or solid state drives, such as the storage drive component 517, and volatile media includes dynamic memory, such as the system memory component 514.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 500. In various other embodiments of the present disclosure, a plurality of the computer systems 500 coupled by a communication link 518 to the network 160 (e.g., such as a LAN, WLAN, PTSN, and/or various other wired or wireless networks, including telecommunications, mobile, and cellular phone networks) may perform instruction sequences to practice the present disclosure in coordination with one another.

The computer system 500 may transmit and receive messages, data, information and instructions, including one or more programs (i.e., application code) through the communication link 518 and the network interface component 506. The network interface component 506 may include an antenna, either separate or integrated, to enable transmission and reception via the communication link 518. Received program code may be executed by processing component 512 as received and/or stored in storage drive component 517 or some other non-volatile storage component for execution.

The present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on payees and payers; however, a payer or consumer can pay, or otherwise interact with any type of recipient, including charities and individuals. The payment does not have to involve a purchase, but may be a loan, a charitable contribution, a gift, etc. Thus, payee as used herein can also include charities, individuals, and any other entity or person receiving a payment from a payer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
 a non-transitory memory; and
 one or more hardware processors coupled to the non-transitory memory and configured to read instructions from the non-transitory memory to cause the system to perform operations comprising:
  detecting driving characteristics of a first vehicle, wherein the driving characteristics include a current driving operation of the first vehicle;
  determining an identification of the first vehicle;
  determining a current status of self-driving automation by the first vehicle based on the current driving operation and the identification;
  determining, based on the detected driving characteristics and the current status of self-driving automation, that the first vehicle is a self-driving vehicle and in a self-driving mode;
  identifying a destination of the first vehicle based on a destination application associated with the first vehicle that navigates to the destination during the self-driving mode;

determining that the destination of the first vehicle is consistent with an intended direction of travel of a second vehicle; and causing, in response to determining that the destination of the first vehicle is consistent with the intended direction of travel of a second vehicle, the second vehicle to emulate a motion of the first vehicle.

2. The system of claim 1, wherein the driving characteristics of the first vehicle are detectable based on at least one of receiving an input from a forward-facing radar or lidar to detect a presence of the first vehicle, receiving electromagnetic signals from the first vehicle, or receiving an input from a social media driving application that tracks other vehicles.

3. The system of claim 2, wherein the driving characteristics of the first vehicle are detectable by direct communication with the first vehicle via Bluetooth or Wi-Fi.

4. The system of claim 3, wherein the driving characteristics of the first vehicle detected by the direct communication with the first vehicle is used to supplement the driving characteristics of the first vehicle detected based on the at least one of receiving the input from the forward-facing radar or lidar to detect the presence of the first vehicle, receiving the electromagnetic signals from the first vehicle, or receiving the input from the social media driving application that tracks other vehicles.

5. The system of claim 1, wherein the operations further comprise calculating a velocity and a location of the first vehicle, wherein causing the second vehicle to emulate the motion of the first vehicle comprises causing the second vehicle to travel at a similar velocity as the first vehicle while maintaining a predetermined distance from the first vehicle.

6. The system of claim 1, wherein the driving characteristics include at least one of an obeyance of traffic laws, a consistency of velocity, or a consistency of position within driving lane markers.

7. The system of claim 6, wherein determining that the first vehicle is a self-driving vehicle comprises determining that the detected driving characteristics matches known behavior patterns of autonomous vehicles.

8. The system of claim 1, wherein the destination of the first vehicle is determined by communicating with the destination application being executed by an automobile control associated with the first vehicle or communicating with a travel server.

9. The system of claim 1, wherein determining that the destination of the first vehicle is consistent with the intended direction of travel of a second vehicle comprises comparing the destination of the first vehicle to a destination of the second vehicle.

10. The system of claim 1, wherein the operations further comprise switching, upon the determining one of a change in a direction or the destination of the first vehicle, that traveling conditions have become unsafe, or that the driving characteristics of the first vehicle is no longer detectable, the second vehicle back to a human-driving mode.

11. A method comprising:
detecting a presence of a first vehicle, wherein the presence include a current driving operation of the first vehicle;
determining an identification of the first vehicle;
determining a current status of self-driving automation by the first vehicle based on the current driving operation and the identification;
determining that the first vehicle is a self-driving vehicle in a self-driving mode based on a detection of a driving characteristics of the first vehicle from the current driving operation and the current status of self-driving automation;
determining that an identified destination of the first vehicle is consistent with an intended destination of a second vehicle based on a destination application associated with the first vehicle that coordinates the identified destination during the self-driving mode; and
causing, in response to determining that the identified destination of the first vehicle is consistent with the intended destination of the second vehicle, the second vehicle to emulate a motion of the first vehicle.

12. The method of claim 11, wherein the driving characteristics of the first vehicle are detected based on at least one of receiving an input from a forward-facing radar or lidar to detect a presence of the first vehicle, receiving electromagnetic signals from the first vehicle, or receiving an input from a social media driving application that tracks other vehicles.

13. The method of claim 11, further comprising calculating a velocity and a location of the first vehicle, wherein causing the second vehicle to emulate the motion of the first vehicle comprises causing the second vehicle to travel at a similar velocity as the first vehicle while maintaining a predetermined distance from the first vehicle.

14. The method of claim 11, wherein the destination of the first vehicle is determined by communicating with an automobile control associated with the first vehicle or communicating with a travel server.

15. The method of claim 11, wherein determining that the destination of the first vehicle is consistent with the intended direction of travel of a second vehicle comprises comparing the destination of the first vehicle to a destination of the second vehicle.

16. A non-transitory machine readable medium having stored thereon machine readable instructions executable to cause a machine to perform operations comprising:
detecting driving characteristics of a first vehicle, wherein the driving characteristics include a current driving operation of the first vehicle;
determining an identification of the first vehicle;
determining a current status of self-driving automation by the first vehicle based on the current driving operation and the identification;
determining, based on the detected driving characteristics and the current status of self-driving automation, that the first vehicle is a self-driving vehicle and in a self-driving mode;
identifying a destination of the first vehicle based on a destination application associated with the first vehicle that establishes the destination of the first vehicle for the self-driving mode;
determining that the destination of the first vehicle is consistent with an intended direction of travel of a second vehicle; and
causing, in response to determining that the destination of the first vehicle is consistent with the intended direction of travel of a second vehicle, the second vehicle to emulate a motion of the first vehicle.

17. The non-transitory machine readable medium of claim 16, wherein the driving characteristics of the first vehicle detected by the direct communication with the first vehicle is used to supplement the driving characteristics of the first vehicle detected based on the at least one of receiving the input from the forward-facing radar or lidar to detect the presence of the first vehicle, receiving the electromagnetic signals from the first vehicle, or receiving the input from the social media driving application that tracks other vehicles.

18. The non-transitory machine readable medium of claim 16, wherein the operations further comprise calculating a velocity and a location of the first vehicle, wherein causing the second vehicle to emulate the motion of the first vehicle comprises causing the second vehicle to travel at a similar velocity as the first vehicle while maintaining a predetermined distance from the first vehicle.

19. The non-transitory machine readable medium of claim 16, wherein the driving characteristics include at least one of an obeyance of traffic laws, a consistency of velocity, or a consistency of position within driving lane markers, and wherein determining that the first vehicle is a self-driving vehicle comprises determining that the detected driving characteristics matches known behavior patterns of autonomous vehicles.

20. The non-transitory machine readable medium of claim 16, wherein the operations further comprise switching, upon the determining one of a change in a direction or the destination of the first vehicle, that traveling conditions have become unsafe, or that the driving characteristics of the first vehicle is no longer detectable, the second vehicle back to a human-driving mode.

\* \* \* \* \*